May 21, 1935.  C. F. ADAMS  2,002,213
CUP DROPPING MACHINE
Filed Dec. 26, 1933   6 Sheets-Sheet 1

INVENTOR
CHARLES F. ADAMS
BY A. A. de Bonneville
ATTORNEY

May 21, 1935.  C. F. ADAMS  2,002,213
CUP DROPPING MACHINE
Filed Dec. 26, 1933   6 Sheets-Sheet 2

INVENTOR
CHARLES F. ADAMS
BY
A A de Bonneville
ATTORNEY

May 21, 1935.  C. F. ADAMS  2,002,213
CUP DROPPING MACHINE
Filed Dec. 26, 1933   6 Sheets-Sheet 4

INVENTOR
CHARLES F. ADAMS
ATTORNEY

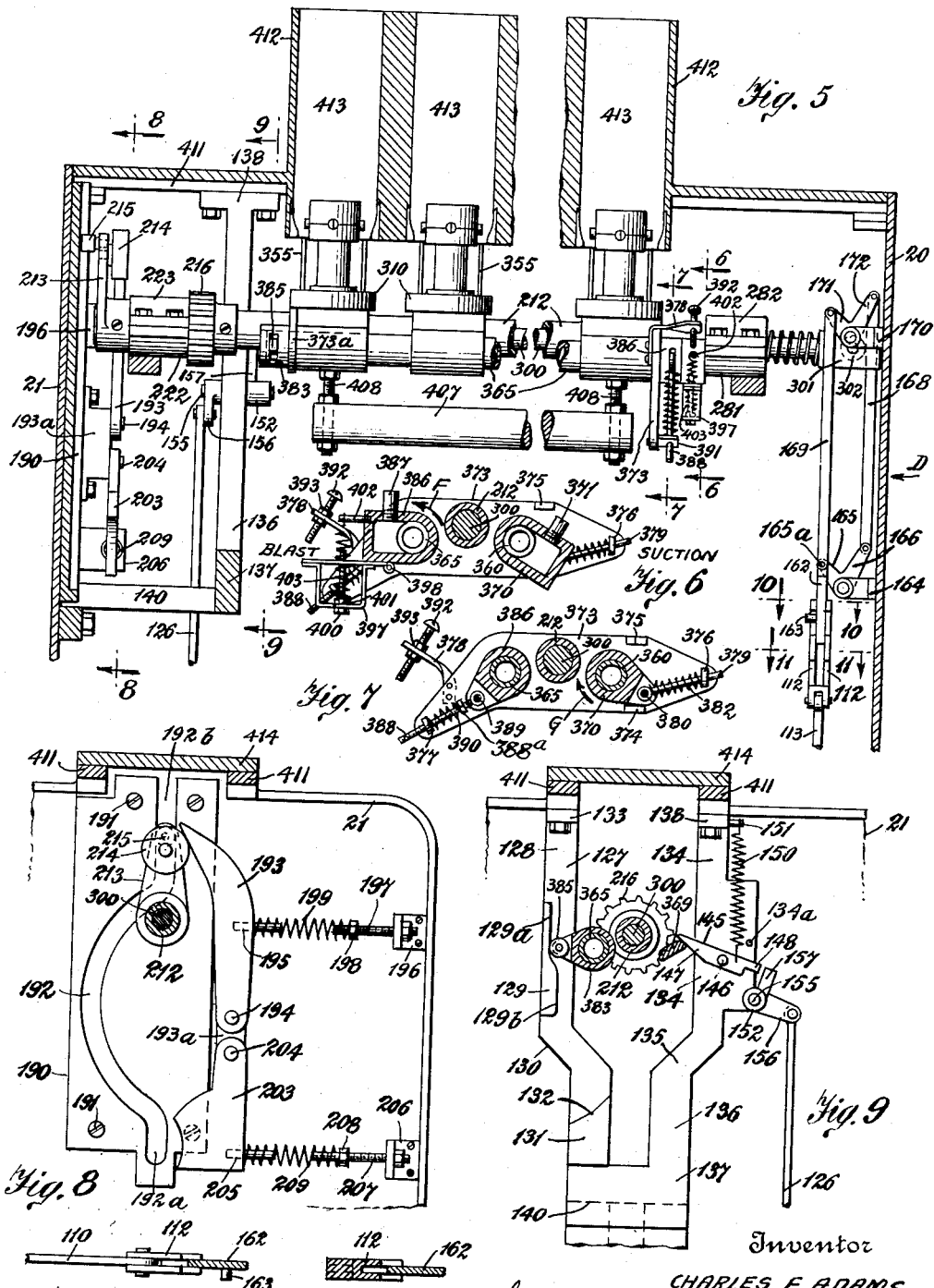

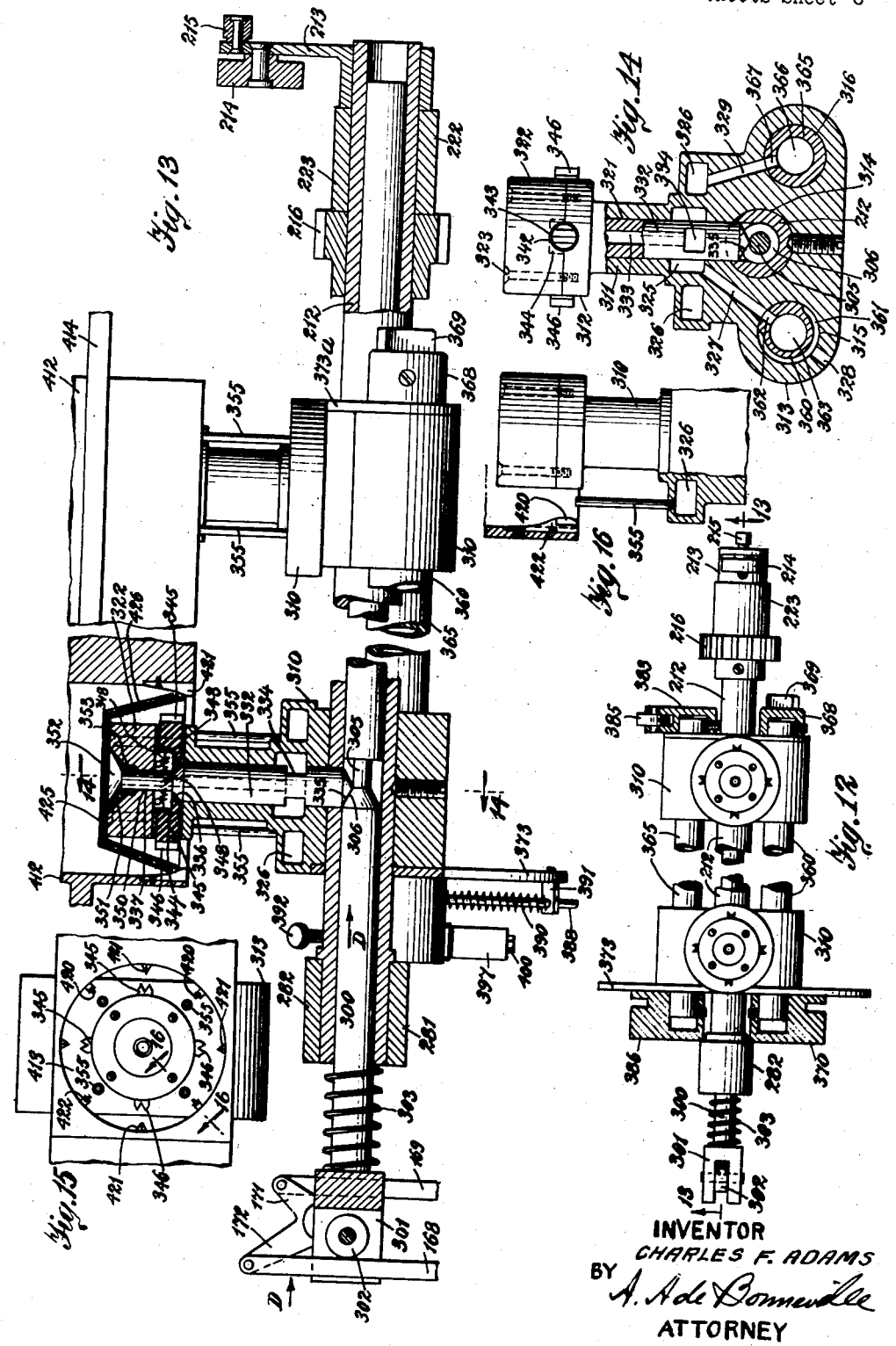

Patented May 21, 1935

2,002,213

UNITED STATES PATENT OFFICE 2,002,213

CUP DROPPING MACHINE

Charles F. Adams, New York, N. Y.

Application December 26, 1933, Serial No. 703,873

11 Claims. (Cl. 214—8.5)

This invention relates to a cup dropping machine and is an improvement and continuation in part of my patent application for cup dropping machines described in my application filed March 3rd, 1932, Serial Number 596,561 and in my application filed November 3rd, 1932, Serial Number 641,364.

The object of the present invention is an improvement in the construction of automatic means for effecting the discharge of cups to be dispensed from cup supply cylinders. The second object of the invention is the production of improved means for reciprocating and turning suction heads that coact with cup supply cylinders to withdraw cups from said cylinders, said means being in continuous contact relation with said suction heads.

The third object of the invention is the production in a cup dropping machine of means to cushion the ends of the movements of suction heads that are both turned and reciprocated. Other objects will be evident from the specification and claims hereinafter set forth.

Figure 1:
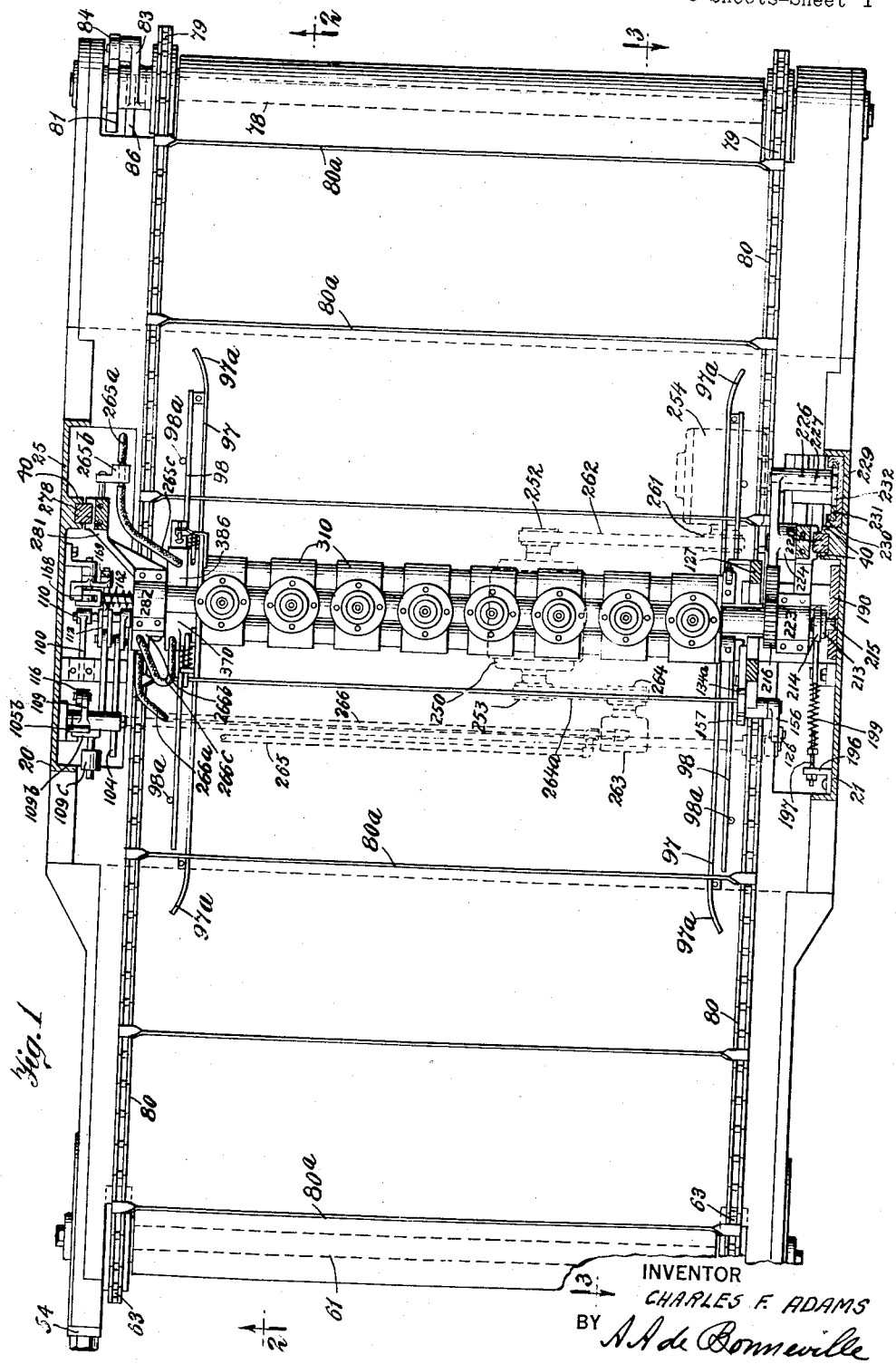
Figure 2:
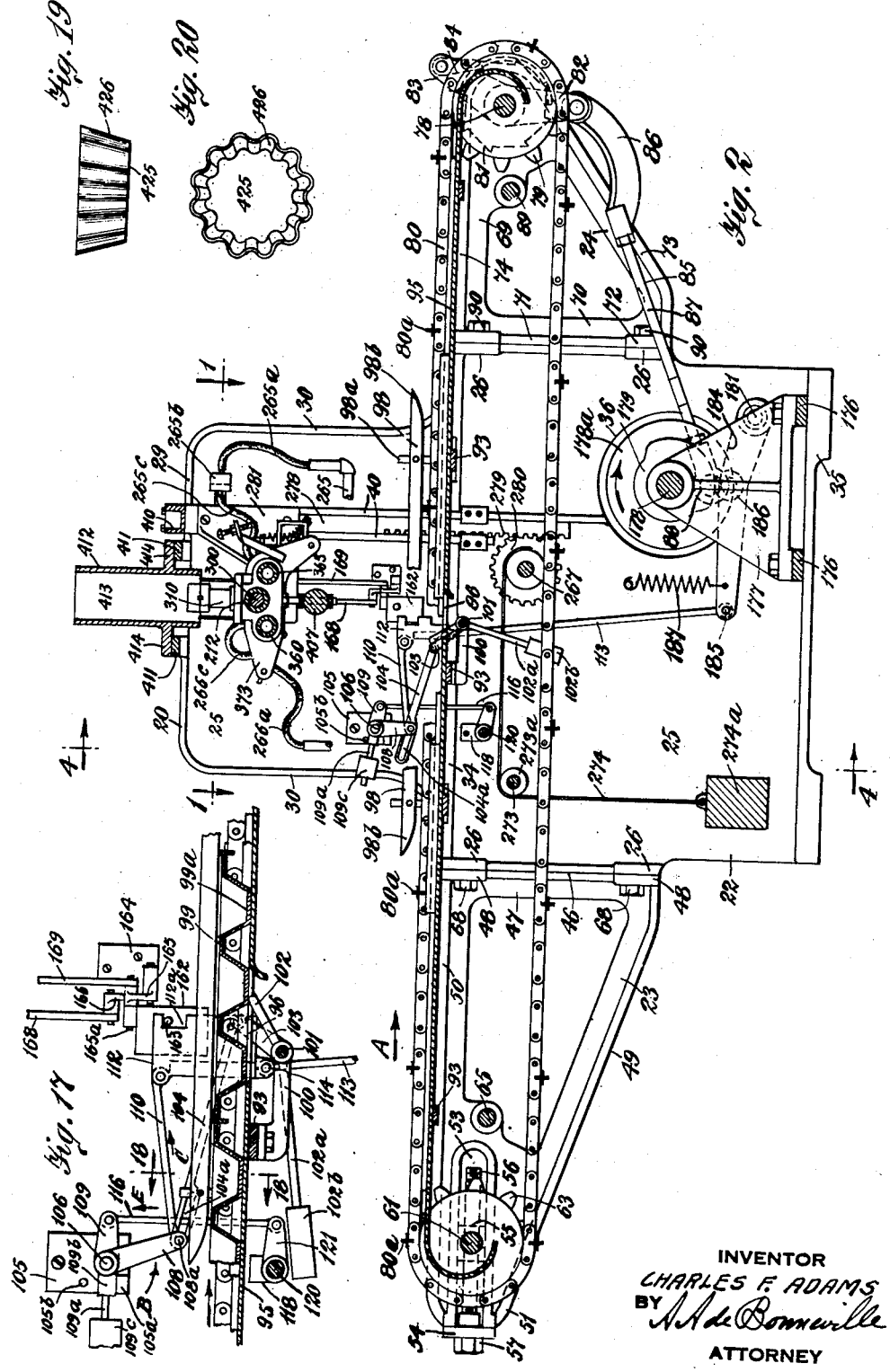
Figure 3:
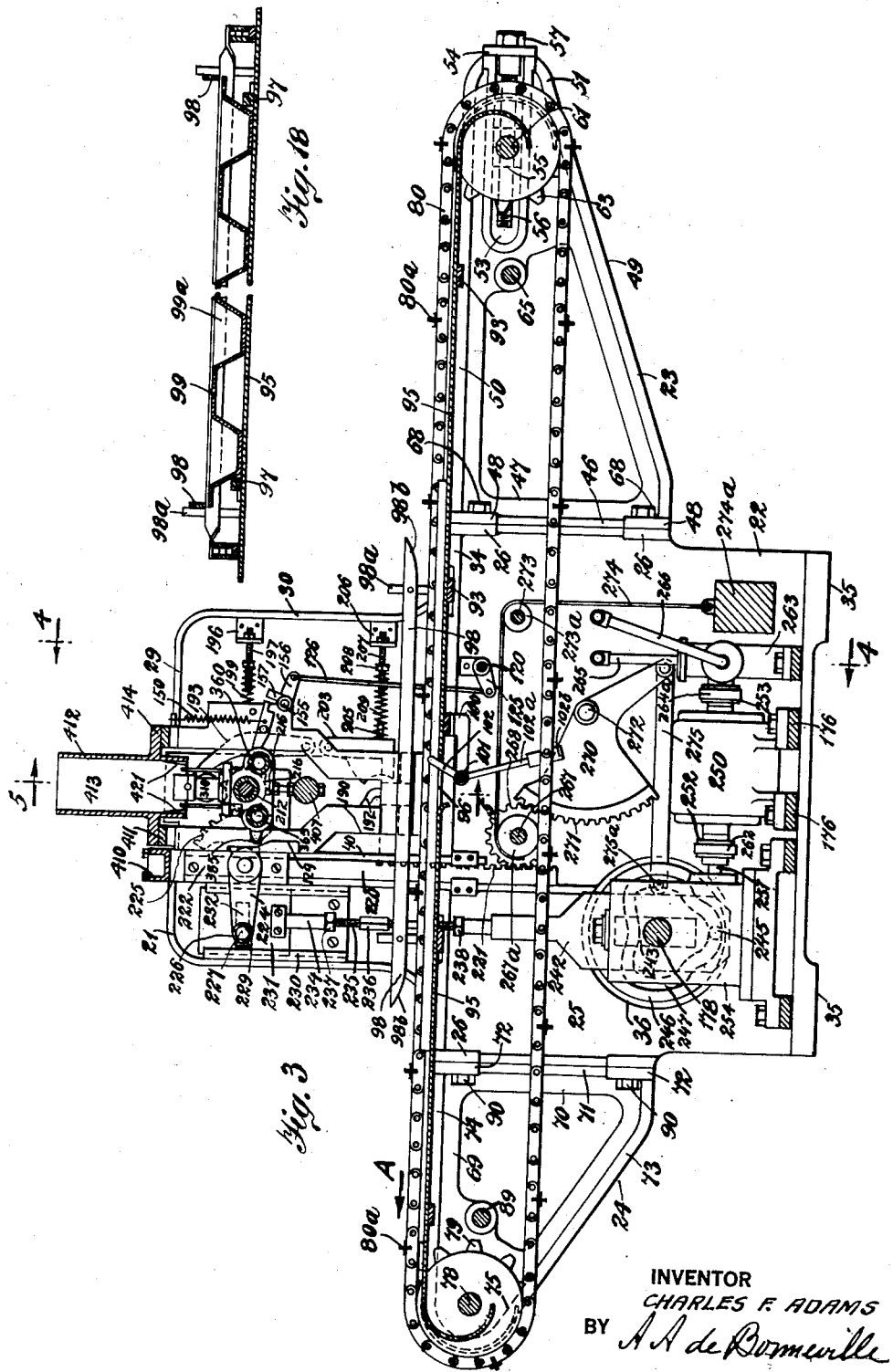
Figure 4:
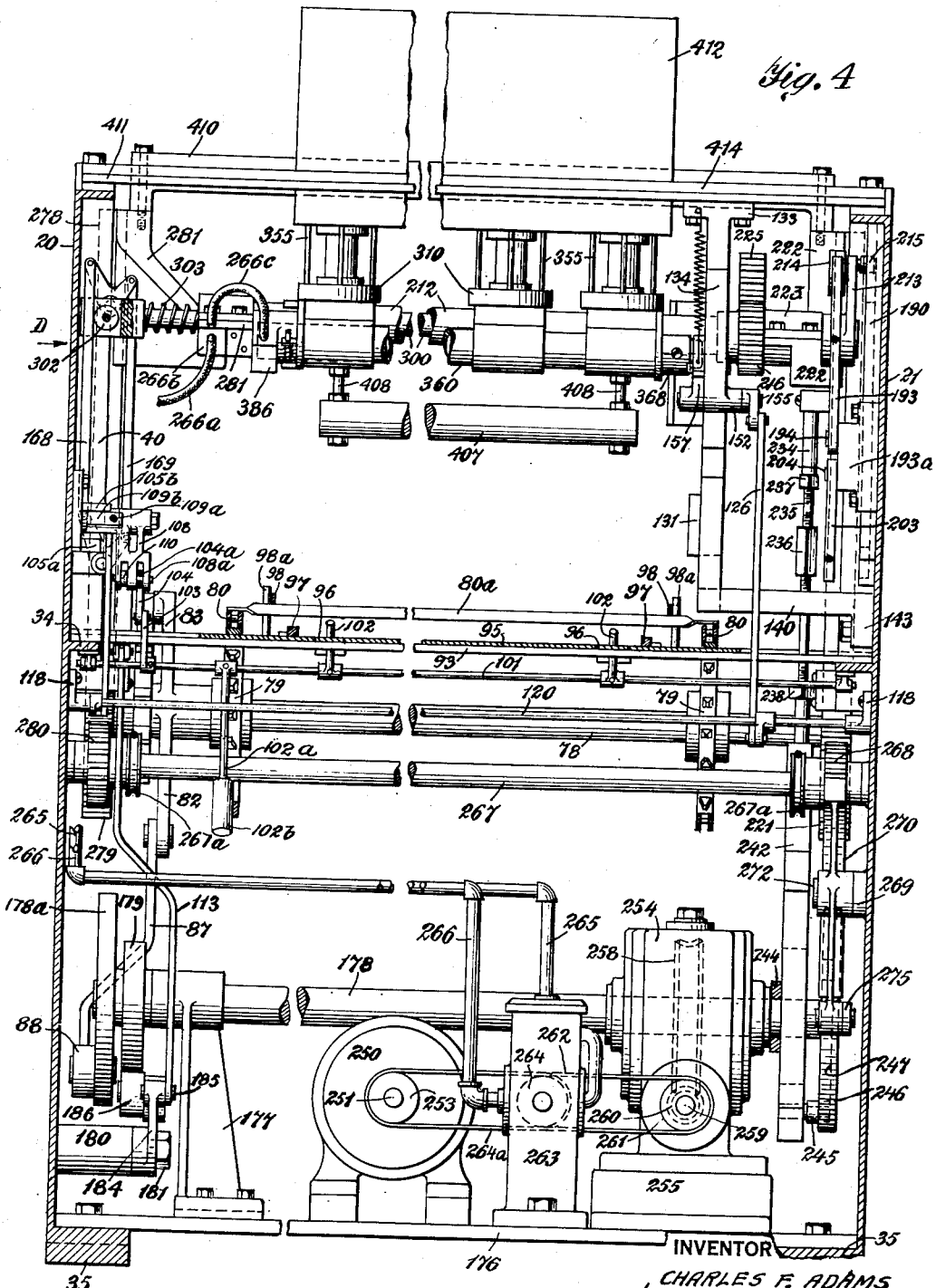

Referring to the drawings, Fig. 1 represents a top view of an exemplification of the improved cup dropping machine and a section of Fig. 2 on the line 1, 1; Fig. 2 shows a section of Fig. 1 on the line 2, 2; Fig. 3 indicates a section of Fig. 1 on the line 3, 3; Fig. 4 represents an enlarged section of Fig. 3 on the line 4, 4; Fig. 5 shows an enlarged fragmentary section of Fig. 3 on the line 5, 5; Fig. 6 indicates an enlarged section of Fig. 5 on the line 6, 6; Fig. 7 is an enlarged section of Fig. 5 on the line 7, 7; Fig. 8 represents a section of Fig. 5 on the line 8, 8; Fig. 9 shows a section of Fig. 5 on the line 9, 9; Fig. 10 represents a section of Fig. 5 on the line 10, 10; Fig. 11 indicates a section of Fig. 5 on the line 11, 11; Fig. 12 shows a partial top view of Fig. 4 with parts in section; Fig. 13 represents an enlarged partial section of Fig. 12 on the line 13, 13; Fig. 14 indicates a partial section of Fig. 13 on the line 14, 14; Fig. 15 shows a partial top view of Fig. 13; Fig. 16 is a partial section of Fig. 15 on the line 16, 16; Fig. 17 is an enlarged fragmentary portion of Fig. 2 with some of its elements in section and in different positions; Fig. 18 represents a fragmentary section of Fig. 17 on the line 18, 18; Fig. 19 indicates a side view of one of the corrugated cups dispensed by the cup dropping machine and Fig. 20 is a top view of Fig. 19.

The cup dropping machine in this instance is indicated having the side frames 20 and 21. Each of said frames comprises the central member 22, to which are bolted the end members 23 and 24. The central members 22 are each indicated with the vertical wall 25. Vertical lugs 26 are integral with the members 22. The said central members 22 have each formed therewith a flange having the horizontal portion 29 and the vertical portion 30. A flange 34 extends inwardly from the wall 25 of each member 22. Feet 35 are shown integral with each central member 22, and an opening 36 is indicated in each wall 25. Vertical guides 40 project from the inner face of each of the walls 25.

The members 23 of the frames are triangular in shape and each comprises the vertical wall 46 with the vertical flange 47 having formed therewith the lugs 48, the inclined flange 49 and the horizontal flange 50. The flanges 49 and 50 are connected by the crown portion 51. In the outer ends of the members 23 are formed the guide openings 53 which are provided with the detachable caps 54. A slide block 55 is guided in each of said openings 53 and has in threaded engagement therewith the adjusting screw 56, having the head 57, which latter bears against the cap 54. A cross shaft 61 has its end portions journaled in the slide blocks 55. A pair of sprocket chain wheels 63 are fastened to the shaft 61. Spacer bolts 65 connect the members 23 of the frames of the machine. The members 23 of the frames are connected to the members 22 by the bolts 68. The members 24 of the frames are each triangular in shape, and each comprises the horizontal wall 69 and the vertical wall 70 with the flange 71 having the lugs 72. The inclined flange 73 and the horizontal flange 74 are indicated with each of the members 24. The flanges 73 and 74 are connected by the crown portion 75. In the walls 69 are journaled the ends of the shaft 78. Adjacent to the ends of the shaft 78 are fastened the sprocket chain wheels 79. A pair of sprocket chains 80 are engaged by the sprocket chain wheels 63 and 79. Conveyor cross bars 80a spaced from one another have their ends connected to the chains 80. A ratchet wheel 81 is fastened to the shaft 78. A ratchet lever having the arms 82 and 83 is loosely supported on the shaft 78. To the arm 83 is pivoted the pawl 84 which coacts with the ratchet wheel 81. To the arm 82 is pivoted one end of the connecting rod 85 having the curved member 86, and to the latter is bolted the rod 87 having the eye 88. A spacer bolt 89 connects the members 24 of the frames. The members 24 are bolted to the members 22 by the bolts 90. To the flanges 34, 50 and 74 are fastened the cross bars 93. A platform 95 having the openings 96 is fastened to the cross bars 93. The chains 80 with the cross bars 80a constitute a conveyor. To the platform 95 are fastened a pair of longitudinal guide strips 97, spaced from each other, Figs. 1, 4 and 18, having the curved ends 97a. A pair of longitudinal guide strips 98, spaced from each other and having the curved or tapered ends 98b are fastened to the posts 98a which extend from the platform 95. Pans 99 each having a plurality of nests 99a are supported on the platform 95 and are maintained in proper position by the guide strips 97 and 98. Referring to Figs. 1 to 7, 9 to 11 and 17, to one of the cross bars 93 are fastened the brackets 100, which have journaled therein the ends of the cross shaft 101. A pair of detector fingers 102 are fastened to the shaft 101. The outer ends of the fingers 102 extend through the openings 96. An arm 102a with the counter weight 102b is fastened to the shaft 101. An arm 103 extends from the shaft 101, and a link 104 has one end pivoted to the arm 103. A slot 104a is indicated at one end of the link 104. A pad 105 having the stop lugs 105a and 105b extends from one of the walls 25 and a journal stud 106 extends from the pad 105. A bell crank having the arms 108 and 109 is pivoted on the stud 106. The arm 108 has extending therefrom the pin 108a which engages the slot 104a. An arm 109a with the stop block 109b and the counter weight 109c extends from the stud 106. A link 110 has one end pivoted on the pin 108a and its other end is pivoted to the U shaped latch bracket 112. The latch bracket 112 having the recess 112a is pivoted to the link 113 by the pivot 114. A link 116 has one end pivoted to the bell crank arm 109. To the side frames 20 and 21 are fastened a pair of journal brackets 118 and in which is journaled the cross shaft 120. An arm 121 extends from the cross shaft 120 and to which is pivoted the link 116. Adjacent to the other end of the shaft 120, see Fig. 3, is fastened the arm 125, to which is pivoted the lower end of the link 126. To the side frame 21, see Fig. 9 is fastened the cam bracket 127, comprising the vertical member 128 having the cam 129 with the thin portion 129a and the thick portion 129b. The member 128 is shown with the inclined portion 130 and the cam 131 having the cam surface 132.

At the upper end of the member 128 is indicated the foot 133. The second vertical member 134 having the stop pin 134a of the bracket 127, is indicated with the inclined portion 135, which joins with the vertical portion 136. A horizontal member 137 connects the portions 131 and 136. A foot 138 is shown at the upper end of the member 134. A lower member 140 extends from the member 137 and terminates in the foot 143, which latter is fastened to the side frame 21. A trip 145, Fig. 9, is pivoted to the member 134 by means of the pivot 146. The trip 145 has the tapered end 147 and at its other end is formed the rabbet 148. A spring 150 has one end fastened to the trip 145 and its other end is fastened to a pin 151 extending from the foot 138. The member 134 of the bracket 127 has formed therewith the journal bearing 152 which supports the pivot 155. To one end of the pivot 155 is fastened the arm 156, which latter is pivoted to the upper end of the link 126. To the other end of the pivot 155 is attached the latch arm 157 and the latter coacts with the rabbet 148 of the trip 145.

A latch plate 162 is pinned to the arm 165 by means of the pivot 165a, Figs. 5 and 17 and has extending therefrom the latch pin 163. To the side frame (Fig. 5) 20 is fastened the journal bracket 164, which has pivoted thereto the bell crank having the arms 165 and 166. An outer link 168 has one end pivoted to the arm 166, and an inner link 169 has one end pivoted to the arm 165. A journal bracket 170 above the bracket 164 is fastened to the frame 20 and has pivoted thereto the bell crank having the arms 171 and 172. The upper end of the link 168 is pivoted to the arm 172 and the upper end of the link 169 is pivoted to the arm 171. Referring, Figs. 2, 4, 5, 12 and 13, a motor platform comprises the bars 176, the ends of which are supported on the feet 35. A journal bracket 177 is supported upon and fastened to a pair of the bars 176. The main drive shaft 178 of the machine has one end journaled in the bracket 177 (see Figs. 2 and 4). A conveyor crank disk 178a is fastened to the shaft 178. A cam 179 is fastened to the shaft 178. A hub 180 extends from the side frame 20, and has connected thereto the screw pivot 181. A lever 184 has one end pivoted to the screw pivot 181 and its other end is pivoted to the link 113, by means of the pivot 185. A roller 186 is journaled to the lever 184 and coacts with the cam 179. A helical spring 187 has one end fastened to the frame 20 and its other end is fastened to the lever 184.

Referring to Figs. 3, 4, 7 and 8, to the frame 21 is fastened the cam bracket 190, by means of the screws 191. The bracket 190 has formed therein the cam groove 192, having the straight portions 192a and 192b. A shock lever 193 is pivoted to the bracket 193a of the side frame 21 by means of the pivot 194. A stem 195 extends from the lever 193. A bracket 196 extends from the side frame 21. A threaded stem 197 extends from the bracket 196 and is provided with the adjusting nut 198. A helical buffer spring 199 has its end portions supported on the stems 195 and 197. A second shock lever 203 is pivoted to the bracket 193a of the side frames 21 by means of the pivot 204. A stem 205 extends from the lever 203. A bracket 206 is fastened to the side frame 21, and has extending therefrom the threaded stem 207 with the adjusting nut 208. A helical buffer spring 209 has its end portions supported on the stems 205 and 207.

A tubular suction head shaft is shown at 212. An arm 213, see Fig. 13, is fastened to the shaft 212 and has journaled to its outer end the roller 214. The latter coacts with the shock levers 193 and 203. A second roller 215 is journaled to the arm 213 and coacts with the cam groove 192. A spur gear 216 is fastened to the suction head shaft 212.

In the vertical guides 40 of the side frame 21 is guided the rack bar 220 having the rack teeth 221. A journal bracket 222 is fastened to the rack bar 220. The bracket 222 is provided with the cup 223. A segmental lever 224 having the teeth 225 is pivoted to the bracket 222. A boss 226 extends from the lever 224 and supports the pin 227. On the outer end of the pin 227 is supported the square slide block 229, Fig. 3. A pair of slide bars 230 are fastened to the side frame 21 and guide the slide block 231. The latter is provided with the horizontal guide groove 232 for the slide block 229. A bracket 234 is bolted to the slide block 231. A screw 235 with the adjusting handle 236 has one end in threaded engagement with the bracket 234. Jam nuts 237 and 238 are provided for the screw 235. A yoke 242 has its upper end in threaded engagement with the screw 235, and has an elongated opening 243 which straddles the shaft 178. A collar, 244, (Fig. 4,) fastened to the shaft 178 bears against the yoke 242. A roller 245 is journaled to the yoke 242. A disc 246 is fastened to the shaft 178, and has integral therewith the cam groove 247, Fig. 3.

Referring to Figs. 1, 2, 3 and 4, a pair of the cross bars 176 support the electric motor 250 having the armature shaft 251 with the pulleys 252 and 253. A housing 254 is shown with the base 255, which latter is fastened to and supported on the cross bars 176. The shaft 178 extends through the housing 254. A worm wheel 258 in the housing 254 is fastened to the shaft 178. A shaft 259 is journaled in the housing 254 and has fastened thereto a worm 260 which meshes with the worm wheel 258. A pulley 261 is fastened to the shaft 259. A belt 262 connects the pulleys 252 and 261. An air pump 263 is fastened to some of the bars 176. A pulley 264 of the pump 263 is connected to the pulley 253 of the armature shaft 251 of the electric motor 250 by means of the belt 264a. Blast piping 265 extends from the pump 263 to the flexible tubing 265a. The latter is attached to the hollow bracket 265b extending from the bracket 281. From the bracket 265b extends the flexible tubing 265c which latter is connected with the nozzle 387, Fig. 6. Suction piping 266 extends from the pump 263 and has connected thereto the flexible tubing 266a. A hollow bracket 266b (see Fig. 1) extends from the bracket 281. Flexible tubing 266c extends from the hollow brackets 266b and connects with the nozzle 371, Fig. 7. A shaft 267, Fig. 4, has its end portions journaled in the side frames 20 and 21. Pulleys 267a are fastened to the shaft 267. A spur gear 268 is fastened to the shaft 267 and meshes with the teeth 221 of the rack bar 220 (see Fig. 3). A boss 269 extends from the side frame 21. A segmental lever 270 is shown with the teeth 271, and is pivoted to the boss 269 by means of the screw pivot 272. The teeth 271 mesh with the spur gear 268. A shaft 273 has its ends journaled in the side frames 20 and 21. A pair of pulleys 273a in alignment with the pulleys 267a are fastened to the shaft 273. A pair of ropes 274 have each one end fastened to one of the pulleys 267a and extend over the pulleys 273a. The other ends of said ropes suspend the weights 274a.

A link 275 has one end pivoted to the disc 246 by the pin 275a and its other end is pivoted to the segmental lever 270. A rack bar 278, Fig. 2, is guided in the vertical guide bars 40 of the side frame 20 and has indicated therewith the teeth 279. A spur gear 280 is fastened to the shaft 267 and meshes with the teeth 279 of the rack bar 278. A journal bracket 281 is supported over the guide bars 40 of the side frame 20 and is fastened to the rack bar 278. The bracket 281 is provided with the cap 282 (see Fig. 13).

Referring to Figs. 1, 2, 3, 4, 5, 6, 12, 13, 14, 15 and 16. The tubular suction head shaft 212 is journaled in the brackets 222 and 281. A controlling shaft 300 is slidably supported in the shaft 212 and has at one end the bifurcated journal bracket 301, Fig. 12. The bracket 301 has journaled therein the roller 302 which coacts with the link 168. A spring 303 encircles the shaft 300 and bears between the bracket 301 and one end of the shaft 212. The shaft 300 has formed therein a plurality of controlling grooves having the cylindrical portions 305 and the tapered portions 306. A row or plurality of suction heads are each indicated in its entirety by the numeral 310. Each suction head 310 comprises the barrel 311, Fig. 14, having the head 312 and the body portion 313. A cylindrical seat 314 is formed in the body portion 313 for the tubular shaft 212. Seats 315 and 316 are also indicated in the body portion 313. A longitudinal bore 321 is shown in the barrel 311. A cap 322 is detachably connected to the head 312 by means of the screws 323. Annular ports 325 and 326 are indicated in the body portion 313. A port 327 extends between the port 325 and the seat 315 and a port 328 extends from the seat 315 to the outside of the body portion 313. A port 329 extends between the port 326 and the seat 316. An operating plunger 332 having the axial port 333 is slidably supported in each suction head 310, and is shown with the cross port 334 which joins with the port 333. Each plunger 332 has the lower tapered end 335 and the upper tapered portion 336 having the tubular stem 337 extending therefrom. In the head 312 and cap 322 are formed the openings 342. In each of the openings 342 is slidably positioned a holder sleeve 343 which has integral therewith the guide plate 344. The holder sleeves 343 are in pairs axially in line with each other and one pair in this instance is at right angles to the other pair. In each holder sleeve is tightly positioned a rubbing finger 345 and the outer portion of each finger 345 has a corrugated end 346. Springs 348 connect the guide plates 344 of each pair of holder sleeves 343. In each of the caps 322 is formed an axial opening 350 which joins with the tapered opening 351 at its top end. A suction cup 352 is indicated with the sleeve end 353 which latter engages a recess in the cap 322. Blast nozzles 355 extend from the annular port 326 of each suction head 310 and their upper ends extend upwardly to about the level of the lower face of each head 312. A tubular suction valve 360 (see Fig. 14) having a circumferential port 361 and the port 362 for each of the heads 310 is positioned in the seats 315. The longitudinal port of the valve 360 is indicated at 363. A tubular blast valve 365 with the longitudinal port 366 is positioned in each of the seats 316 of the heads 310. A port 367 is provided in the blast valve 365 for each of the heads 310.

The suction valve 360 at one end thereof has connected thereto the cap 368, Figs. 12, 13, with the cam lug 369 extending therefrom which coacts with the cam 132, and also coacts with the tapered end 147 of the trip 145. Referring to Figs. 1, 4, 5, 6 and 7, a hollow cap lever 370 having the hose connection 371 is fastened to one end of the suction valve 360. A bracket plate 373 is fastened to one of the suction heads 310 at one end of the row thereof and a bracket plate 373a is fastened to the suction head at the other end of the row. The plate 373 has integral therewith the stop lugs 374, 375 and has extending therefrom the eyelets 376 and 377. A bracket 378 extends from the bracket plate 373. A guide rod 379 having the eyelet 380 is pinned to the lever 370. A spring 382 encircles the rod 379 and its ends bear between the eyelets 380 and 376.

The blast valve 365 has connected to one end thereof the cap lever 383. To one end of the lever 383 is journaled the roller 385. The latter coacts with the cam 129, see Fig. 9. At the other end of the blast valve 365 is fastened the hollow cap lever 386 having the hose connection 387. A threaded guide rod 388 with the nut 388a and the eyelet 389, has one end thereof pivoted to the lever 386 and its other end extends through the eyelet 377. A spring 390 encircles the rod 388 and its ends bear against the nut 388a and the eyelet 377 on the plate 373. An adjusting screw 392 with jam nuts 393 extends through an opening in the bracket 378. A hinge bracket 397 is hinged to the cap lever 386 by means of the pin 398. A tension screw 400 is adjustably supported in the bracket 397, by the nuts 401. A pin 402 extends from the lever 386. A spring 403 has one end fastened to the pin 402 and its other end is fastened to one of the nuts 401.

A counter weight 407 Fig. 5 has its ends connected to a pair of the suction heads 310 by means of the screws 408.

A channel shaped bar 410 connects the brackets 222 and 281. Plates 411 connect the upper ends of the side frames 20 and 21. A plurality of cup supply cylinders 412 each with the chamber 413, having integral therewith the flanges 414 which are fastened to the plates 411. One of the cylinders 412 is provided for each suction head 310. The inner surface of each supply cylinder 412 at its lower end has extending therefrom a plurality of longitudinal flexible friction fingers 420 and a plurality of longitudinal metallic stop fingers 421 (see Fig. 15). A holder 422 is provided for each of the fingers 420.

To operate the cup dropping machine, a plurality of the cups to be dispensed are placed in inverted position in the cup supply cylinders 412. The cups each comprise the bottom wall 425 and the corrugated side wall 426. The lower ends of the side walls 426 of the cups when adjacent to the lower ends of the cup supply cylinders 412 are supported by the friction fingers 420 and the metallic stop fingers 421. The pans 99 are placed upon the platform 95 in operative position. The guide strips 97 guide the pans 99 laterally, and the guide strips 98 maintain them in contact with the platform 95 and prevent them rising. The tapered ends 98b of the strips 98 provide means for guiding the pans 99 to their horizontal operative position.

The electric motor 250, Figs. 1, 3 and 4, is started by electric appurtenance not shown, and by means of the belt 262, the worm 260 is turned. The worm wheel 258 turns with the worm 260 and thereby the main drive shaft 178 is turned. By this means the disc 246 is turned and the link 275 swings the segmental lever 270, and the spur gears 268 and 280 turn. This causes the rack bars 220 and 278 to rise. When the said rack bars rise the yoke 242 moves upwardly. The latter moves by reason of the coaction of the cam groove 247 of the disc 246 with the roller 245. The slide block 231 rises with the yoke 242. With the upward movement of the rack bars 220 and 278, the suction heads 310 and the segmental lever 224 rise. When the suction heads 310 are elevated above the conveyor cross bars 80a, the conveyor with the sprocket chains 80 start to move in the direction of the arrow A, Figs. 2 and 3. The sprocket chains 80 are actuated as follows. The conveyor crank disc 178a turns with the shaft 178, and thereby the connecting rod 85 is moved. The connecting rod swings the ratchet lever having the arms 82 and 83 and the pawl 84 intermittedly turns the ratchet wheel 81. The shaft 78 turns with the ratchet wheel 81 and thereby the sprocket chain wheels 63 and 79 are turned. When the suction heads 310 begin to rise, Figs. 3, 5, 8 and 13, the roller 215 travels up the lower straight portion 192a of the cam groove 192. When the suction heads 310 are just above the conveyor the roller 215, Fig. 8, begins to enter the curved portion of the cam groove 192. At the same time the coaction of the roller 245 and the cam groove 247 maintains the yoke 242 and the slide block 231 stationary until the suction heads make a turn of 180 degrees. The rack bars 220 and 278 continue to rise and the segmental lever 224 swings the suction heads 310 from their lower inverted position to their upward upright position as indicated in the drawings. The turning of the suction heads 310 results from the coaction of the spur gear 216 and teeth 225 of the segmental lever 224. While the sprocket chains 80 are moved in the direction of the arrow A, Figs. 2 and 3, the conveyor cross bars 80a, which are equally spaced from each other, permit one of the pans 99 to be positioned between each pair of them. The said cross bars position each row of nests 99a in line with the axial centers of the suction heads 310 at the proper time. When the pans 99 move in the direction of the arrow A, Figs. 2, 3, they contact with the detector fingers 102 which swing and partially turn the shaft 101, Fig. 17. Thereby the arm 103 is swung down, which moves the link 104, and the arm 108 of the bell crank swings in the direction of the arrow B. By this means the link 110 moves in the direction of the arrow C and the U shaped latch bracket 112 engages the latch pin 163. It will be noted that when there are no pans 99 on the platform 95, the detector fingers remain stationary and consequently the latch bracket 112 is not locked with the latch pin 163. Referring to Figs. 2, 3, 9 and 17, when the arm 108 swings in the direction of the arrow B, the arm 109 and the link 116 move upwardly in the direction of the arrow E and partially turn the cross shaft 120. When the shaft 120 turns, the link 126 through the intervention of the arm 125, Fig. 3, rises and the latch arm 157, Figs. 3, 9, locks with the rabbet 148 of the trip 145.

Just before the suction heads 310 have turned to their upright position indicated in the drawings, the roller 214 contacts with the shock lever 193. While the said suction heads are moving upwardly the yoke 242 and the slide block 231 with their appurtenances also move upwardly and the roller 215 is positioned in the upper portion 192b of the cam groove 192 and maintains said heads steady as they rise. The coaction of the roller 214 with the shock lever 193 cushions the end of the up stroke of the said suction heads 310. During the upstrokes of the suction head 310, Figs. 3, 5, 6, 7 and 9, the roller 385 contacts with the thick portion 129b of the cam 129 and the blast valve 365 turns in the direction of the arrow F, Fig. 6, to open the same to bring the port 367 in alignment with the port 329. Thereby the blast from the pump 263 enters the annular port 326 and is discharged from the blast nozzles 356. When the roller 385 contacts with the cam 129, the hinge bracket 397, Fig. 6, is separated from the adjusting screw 392 and remains separated until the roller 385 engages the thin portion 129a of the cam 129 and turns off the blast. The hinge bracket 397 at this instant contacts with the adjusting screw 392. The adjusting screw 392 can be located in different positions to vary the time of the closure of the blast valve 365.

Just before the suction heads 310 reach the ends of their up strokes, the cam lug 369, Fig. 9, contacts with the tapered end 147 of the trip 145, and the tubular suction valve 360 is turned in the direction of the arrow G, Fig. 6, to align the ports 362 with the ports 327 to produce a suction effect in the suction heads 310. The cap lever 370, Figs.

6, 7 and 9, is separated from the stop lug 375 and swings against the stop lug 374 and the suction valve is positioned in its full open position. The cap lever 370 remains in the latter position by the tension of the spring 382. By this means a suction effect is produced in all the suction heads 310. It will be noted that the spring 382 tends to hold the tubular suction valve 360 both in its open and closed position. The suction heads now rise to their extreme up position, and each stack of cups having the side walls 426 are slightly raised. Thereby suction contact is made between the wall 425 of the lowermost cup and the cap 322. When the suction heads 310 lower the roller 385 rolls from the thin portion 129a, Fig. 9, to the thick portion 129b of the cam 129, and the blast valve 365 is moved in a direction opposite to the arrow F, Fig. 7, and the cap lever 386 is separated from the hinge bracket 397, which allows the roller 385 to engage the thick portion 129b of the cam without jar and thereby functions as a cushion. The roller 385 turns the tubular blast valve until it contacts with the thick portion 129b of the cam 129 to close said valve. The coaction of the cam 179 with the lever 184, Figs. 2, 5 and 17, moves the link 113 downwardly and thereby the latch plate 162 is lowered. The link 169 lowers with the plate 162. By this means the link 168 is moved laterally in the direction of the arrow D, Fig. 5. The link 168 bears against the roller 302 and thereby the controlling shaft 300 is moved in the direction of said arrow D. By this means the tapered portions of the shaft 300 raise the operating plungers 332, and the rubbing fingers 345 are spread, which spreads the side walls 426 of the adjacent cups. Thereby the cups at the lower portions of the cup supply cylinders 412 are pinched between the rubbing fingers 345 and the metallic stop fingers 421. When the suction heads are turning to their inverted position, the conveyor cross bars 80a position the nests 99a of the pans 99, so that the suction heads 310 can drop the cups in the nests of the pans. Just before the suction heads 310 have been completely inverted the roller 214, Fig. 8, contacts with the second shock lever 203 and produces a cushioning effect. The suction heads 310 move straight downwardly, and as the said suction heads move downwardly the cam lug 369, Fig. 9, contacts with the cam surface 132, the suction valve turns and thereby the vacuum is shut off and the cups drop into the nests of the pans. At the same time the pairs of rubbing fingers 345 approach each other to clear the cups. It will be noted that the suction heads 310 are lowered as follows. The rack bars 220 and 278 are lowered by coaction with the spur gears 268 and 280, and the segmental lever 270. The latter coacts with the link 275 which is moved by the pin 275a of the disc 246.

Various modifications may be made in the invention and the present application is to be taken as illustrative and not limitative thereof.

Having described my invention I claim:

1. In a machine the combination of a pair of side frames, a pair of vertical guides extending from the inner face of each of said frames, a rack bar slidably supported in each pair of guides, a main driving shaft journaled in the machine between said frames, a motor supported in the machine, connections between the motor and said driving shaft, a yoke having an elongated opening straddling said driving shaft, means to reciprocate the yoke during the rotations of said driving shaft, a slide block guided in the machine adjacent to its upper end, connecting means between said slide block and yoke, a bracket fastened to each of said rack bars, a segmental lever pivoted to one of said brackets, means at one end of segmental lever coacting with said slide block to swing said segmental lever with reciprocations of said slide block, a tubular suction head shaft having its end portions journaled in said brackets, a spur gear fastened to said tubular shaft in mesh with the teeth of said segmental lever and suction heads fastened to said tubular shaft.

2. In a machine the combination of a pair of side frames, a rack bar slidably guided adjacent to each frame, a journal bracket extending from each rack bar, a tubular suction head shaft having its end portions journaled in said journal brackets, a controlling shaft slidably supported in said tubular shaft, controlling grooves in said controlling shaft, a roller journaled at one end of the controlling shaft, a spring encircling the controlling shaft between said roller and said tubular shaft, suction heads fastened to the tubular shaft, one for each of said grooves, a head with a cap at one end of each suction head, a plunger slidably positioned in each suction head, rubbing fingers slidably positioned in the head and cap of each suction head, a cup supply cylinder coacting with each suction head, a pair of bell cranks one over the other journaled adjacent to one of said side frames, an outer link and an inner link connecting the arms of the bell cranks, said links straddling the roller of the controlling shaft, a main drive shaft journaled in the machine, and automatically detachable connecting means between said main drive shaft and the lowermost of said bell cranks, said outer link pulled downwardly with the rotations of the drive shaft and thereby horizontally move the roller of the controlling shaft to move the controlling shaft in one direction to raise said plungers and spread said fingers to pinch the cups handled by the machine one after the other between said fingers and their coacting cup supply cylinder, said spring on the controlling shaft moving the latter in the opposite direction on the further rotation in each revolution of the main drive shaft, whereby said plungers of the controlling shaft lowers and said fingers are released from the cups.

3. In a machine the combination of a pair of side frames, a rack bar slidably guided adjacent to each frame, a journal bracket extending from each rack bar, a tubular suction head shaft having its end portions journaled in said journal brackets, a controlling shaft slidably supported in said tubular shaft, controlling grooves in said controlling shaft, a roller journaled at one end of the controlling shaft, a spring encircling the controlling shaft between said roller and said tubular shaft, suction heads fastened to the tubular shaft, one for each of said grooves, each of the suction heads comprising a barrel having a longitudinal bore, a head at one end of each barrel, a cap for each head, a plunger slidably positioned in each bore, a lower tapered end for each plunger, an upper tapered portion for each plunger, rubbing fingers slidably positioned in each head and its cap, the lower tapered ends of each plunger coacting with one of said controlling grooves, and the upper tapered portion of each plunger coacting with said rubbing fingers, a cup supply cylinder coacting with each suction head, a pair of journal brackets one over the other fastened to one of said side frames, a bell crank pivoted in each of the latter brackets, an outer link connecting an arm of one bell crank with the similar arm of the other bell crank, an inner link connecting the other arms of the bell cranks, the said links straddling the roller of the controlling shaft, a main drive shaft journaled in the machine and automatically detachable connecting means between said main drive shaft and the lowermost of said bell cranks, said outer link pulled downwardly with the rotations of the drive shaft and thereby horizontally move the roller of the controlling shaft, to move the controlling shaft in one direction to raise said operating plungers and spread said fingers to pinch a cup to be dispensed between them and their coacting cup supply cylinder, said spring on the controlling shaft moving it in the opposite direction on the further rotation in each revolution of the main drive shaft, whereby said plungers lower and said fingers are released from the cups.

4. In a machine of the character described the combination of a pair of side frames, a tubular suction head shaft journaled between the frames, suction heads fastened to the shaft, rubbing fingers slidably supported in each suction head, a controlling shaft slidably supported in the tubular shaft, a platform having a pair of longitudinal openings positioned between the said side frames, a travelling conveyor supported on the platform, cross bars for the conveyor, pans having nests positioned on said platform between said cross bars, a cross shaft journaled below said platform, a pair of detector fingers extending from said cross shaft, adapted to enter said openings in the platform and contact with said pans as they move, a journal stud extending from one of said frames, a bell crank pivoted on said stud, a pin extending from one of the arms of the bell crank, an arm extending from said cross shaft, a link having a slot at one end, one end of said link pivoted to the latter arm and the slot of said link engaging the pin of said bell crank, a latch bracket having a recess slidably supported in the machine, a link having one end pivoted to the latch bracket and its other end pivoted to the pin of the said arm of the bell crank, a link pivoted to the lower end of the latch bracket, means to raise and lower the latter link and thereby raise and lower said latch bracket, a pair of journal brackets one over the other fastened to one of the said side frames, a bell crank pivoted to each of said brackets, links connecting the arms of the bell crank, a roller at one end of the controlling shaft coacting with one of said links to move the controlling shaft in one direction, a latch plate suspended from an arm of one of the latter bell cranks, and a latch pin extending from said latch plate coacting with the recess of the latch bracket.

5. In a machine of the character described the combination of a pair of side frames, a tubular suction head shaft journaled between the said frames, suction heads fastened to the tubular shaft, a tubular suction valve and a tubular blast valve rotatively supported in said heads, a cam lug on one end of the suction valve, means to turn and move up and down said tubular shaft with its suction heads, a yoke extending from one of said side frames, a pivot extending from the yoke, a trip pivoted to said yoke, an arm pivoted to said pivot, a latch arm pivoted to said pivot, said latch arm adapted to lock with said trip, a platform having a pair of longitudinal openings supported between said side frames, pans supported on the platform, means to move the pans, a shaft journaled below the platform, detector fingers fastened to the shaft adapted to contact with said pans during the movements of the latter and swing thereby, connections between the shaft below said platform and the said detector fingers to partially turn the latter shaft and thereby lock the trip with said latch arm, said cam lug on the suction valve contacting with said latch arm during the up stroke of the tubular shaft to open the suction valve, a cam on said yoke and means to turn and lower said tubular shaft and suction heads, said cam lug contacting with the cam on the yoke on the down stroke of said tubular shaft and thereby close the suction valve.

6. In a machine of the character described the combination of a pair of side frames, a tubular suction head, shaft journaled between said frames, suction heads fastened to the tubular shaft, a tubular suction valve and a tubular blast valve rotatively supported in said heads, a roller journaled to one end of the blast valve, means to open and close said suction valve, means to turn and move up and down said tubular shaft with its suction heads, a yoke extending from one of said side frames, and a cam having a thin portion and a thick portion on said yoke, said roller of the blast valve contacting with the thick portion of the said cam on said yoke on the up stroke of the tubular suction head shaft to open said blast valve, said roller when contacting with the thin portion of said cam turning the blast valve to close the same.

7. In a machine the combination of a pair of side frames, a tubular suction head shaft journaled between said frames, suction heads for cups supported on the tubular shaft, a controlling shaft slidably supported in the tubular shaft, means to longitudinally move said controlling shaft, means in the suction heads coacting with said shaft to operate said suction heads for gripping and releasing cups, means to turn and vertically move said tubular shaft and suction head and means to cushion the movements of said tubular shaft at the end of its up and down strokes.

8. In a machine the combination of a pair of side frames, a tubular suction head shaft journaled between said frames, suction heads for cups supported on the tubular shaft, means to turn and vertically move said tubular shaft and suction heads, a cam bracket fastened to one of said side frames, said cam bracket having a curved cam groove with vertical straight portions and its upper and lower ends, a shock lever pivoted to said side frame for the upper portion of the cam, a shock lever pivoted to one of said frames for the lower portion of the cam bracket, flexible means bearing against each of said shock levers, an arm extending from said tubular shaft, a pair of rollers pivoted adjacent to the outer end of said arm, one of said rollers engaging the groove of the cam bracket and the other roller contacting with said shock levers as the controlling shaft reaches the upper and lower portions of its stroke.

9. In a machine the combination of a tubular suction head shaft, a plurality of suction heads fastened to the shaft, rubbing fingers slidably positioned in each suction head, a controlling shaft in said tubular shaft, means to longitudinally move the latter shaft to actuate said rubbing fingers, a tubular blast valve extending through each suction head, a cap lever fastened to one end of the blast valve, a roller journaled to said lever, a bracket plate having an opening for the other end of the blast valve to extend there through, a hollow cap lever fastened to the other end of the blast valve and having one face thereof in contact with said bracket plate, a cam in the machine having a thick portion and a thin portion coacting with said roller, a hinge bracket hinged to said hollow cap lever, a spring flexibly connecting said hollow cap lever and said hinge bracket and means to vertically reciprocate and turn said suction heads, said roller contacting with the thick portion of the said cam when said suction heads are nearly at the end of their up stroke, said blast valve opened by said contact, said blast valve shut off with said roller contacting with the thin portion of said cam, said hinge bracket separating from said hollow cap lever when said roller engages the thick portion of the said cam and producing a cushioning effect and remaining separated until said roller engages the thin portion of the cam.

10. In a machine the combination of a tubular suction head shaft, a plurality of suction heads on said shaft, rubbing fingers slidably positioned in each suction head, means to vertically move and turn said tubular suction head shaft, a controlling shaft in said tubular shaft, means to longitudinally move the latter shaft to actuate said rubbing fingers, a tubular suction valve extending through each suction head, a cap fastened to one end of the tubular suction valve, a cam lug integral with said cap, a bracket plate having an opening for the other end of the tubular suction valve to extend through, a hollow cap lever fastened to the other end of the tubular suction valve, one face of the hollow cap lever in contact with said bracket plate, a pair of stop lugs on said bracket plate for the opposite sides of said hollow cap lever, an eyelet extending from the bracket plate, a guide rod, an eyelet at one end of said rod, the latter eyelet pivoted to the said hollow cap lever, a spring encircling said rod bearing between its eyelet and the eyelet of the bracket plate to tend to maintain the tubular suction valve in its open or closed position, a trip in the machine, said cam lug contacting with said trip just before the suction heads reach the end of their up stroke, to turn the said tubular suction valve to open the s me to produce a suction effect in said suction heads and a cam in the machine, said cam lug of the suction valve contacting with said cam when said suction heads and tubular suction valve lower to cut off and close said tubular suction valve.

11. In a machine the combination of a pair of side frames, a movable element adjacent to one of said frames, a rotating drive shaft journaled in the machine, means between the shaft and said element to reciprocate the latter, a slide block guided in the machine and in connection with said element, a pair of movable brackets in the machine, a second shaft journaled in the pair of brackets, a gear fastened to the latter shaft, a segmental lever pivoted to one of the latter brackets and connecting means between the slide block and said segmental lever at one end thereof, the teeth of the segmental lever in mesh with said gear.

CHARLES F. ADAMS.